United States Patent
Zuppo, III et al.

(10) Patent No.: US 7,825,202 B2
(45) Date of Patent: Nov. 2, 2010

(54) POTASSIUM BASED CATALYST SYSTEMS FOR SYNTHESIZING RUBBERY POLYMERS

(75) Inventors: John Robert Zuppo, III, Canfield, OH (US); Adel Farhan Halasa, Bath, OH (US); Wen-Liang Hsu, Cuyahoga Falls, OH (US); Leh-Yeh Hsu, legal representative, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 86 days.

(21) Appl. No.: 12/248,601

(22) Filed: Oct. 9, 2008

(65) Prior Publication Data

US 2010/0093960 A1  Apr. 15, 2010

(51) Int. Cl.
*C08F 4/44* (2006.01)
*C08F 4/56* (2006.01)
*C08F 4/52* (2006.01)
*B01J 31/14* (2006.01)

(52) U.S. Cl. ............... 526/174; 526/177; 526/178; 502/153; 502/154

(58) Field of Classification Search ......... 526/174, 526/177–178; 502/153–154
See application file for complete search history.

(56) References Cited

U.S. PATENT DOCUMENTS

| | | | |
|---|---|---|---|
| 3,294,768 A * | 12/1966 | Wofford ............... | 526/174 |
| 3,669,943 A | 6/1972 | Komatsu et al. | |
| 3,759,919 A * | 9/1973 | Dillenschneider ........ | 526/174 |
| 3,944,528 A * | 3/1976 | Loveless ............... | 526/174 |
| 4,139,690 A | 2/1979 | Torigoe et al. | |
| 4,396,743 A | 8/1983 | Fujimaki et al. | |
| 4,433,109 A | 2/1984 | Takeuchi et al. | |
| 4,435,312 A * | 3/1984 | Lecolier et al. ......... | 502/157 |
| 4,485,205 A | 11/1984 | Fujimaki et al. | |
| 4,575,534 A | 3/1986 | Oshima et al. | |
| 4,624,296 A * | 11/1986 | Takiguchi ............ | 152/209.1 |
| 4,914,147 A | 4/1990 | Mouri et al. | |
| 5,432,232 A | 7/1995 | Hattori et al. | |
| 5,496,883 A | 3/1996 | Hamada | |
| 5,527,860 A | 6/1996 | Yamakawa et al. | |
| 6,103,842 A | 8/2000 | Halasa et al. | |
| 6,127,472 A | 10/2000 | Kobayashi et al. | |
| 6,329,459 B1 | 12/2001 | Kang et al. | |
| 6,344,518 B1 | 2/2002 | Kobayashi et al. | |
| 6,362,272 B1 | 3/2002 | Tadaki et al. | |
| 6,472,464 B1 | 10/2002 | Morita et al. | |
| 6,518,350 B1 | 2/2003 | Kobayashi et al. | |
| 6,583,244 B1 | 6/2003 | Jasiunas et al. | |
| 6,716,925 B2 | 4/2004 | Jacoby et al. | |
| 6,844,080 B2 | 1/2005 | Kneafsey et al. | |
| 6,992,156 B2 | 1/2006 | Parker et al. | |
| 7,064,171 B1 * | 6/2006 | Halasa et al. ........... | 526/340 |
| 7,101,941 B2 * | 9/2006 | Desbois et al. ......... | 526/177 |
| 7,342,070 B2 | 3/2008 | Tsukimawashi et al. | |
| 2002/0132929 A1 | 9/2002 | Weydert et al. | |
| 2003/0125468 A1 | 7/2003 | Thielen et al. | |
| 2006/0052506 A1 | 3/2006 | Aoki | |

\* cited by examiner

*Primary Examiner*—Milton I Cano
*Assistant Examiner*—Brieann R Fink
(74) *Attorney, Agent, or Firm*—Wood, Herron & Evans, L.L.P.

(57) ABSTRACT

The present invention is directed to a catalyst system for synthesizing rubbery polymers, such as styrene-butadiene rubber, that can be utilized in tire tread rubbers. The catalyst system, in one embodiment, includes an organolithium compound and a potassium alkyl borohydride or potassium alkyl aluminum hydride defined by: $(R)_3A^-(H)K^+$, wherein A is boron or aluminum, H is hydrogen, K is potassium, and R, which is the same or different, is either H, a $C_1$-$C_{10}$ alkyl, a $C_3$-$C_{10}$ cycloalkyl, phenyl, or phenyl substituted $C_1$-$C_{10}$ alkyl, or a $C_3$-$C_{10}$ cycloalkyl, with the proviso that at least one R is a $C_1$-$C_{10}$ alkyl, and further wherein any two R's may optionally be part of a carbocyclic ring. The rubbery polymers can have low to medium vinyl microstructure content, i.e., from about 10% to about 40%, and are useful in tire tread rubber compounds which can exhibit improved wear and tear characteristics.

15 Claims, No Drawings

POTASSIUM BASED CATALYST SYSTEMS FOR SYNTHESIZING RUBBERY POLYMERS

TECHNICAL FIELD

The present invention is directed to a catalyst system for synthesizing rubbery polymers, such as styrene-butadiene rubber including alpha-methylstyrene-butadiene rubber, that can be utilized in tire treads.

BACKGROUND

It is desirable for tires to have good wet skid resistance, low rolling resistance, tear strength, and good wear characteristics. It has traditionally been difficult to improve the wear characteristics of a tire without sacrificing wet skid resistance and traction characteristics. These properties depend, to a great extent, on the dynamic viscoelastic properties of the rubbers utilized in making the tire. Such viscoelastic properties are controlled largely by the microstructure, macrostructure, and the degree of branching of the elastomer.

Rubbers having a high rebound have traditionally been utilized in making tire tread rubber compounds to reduce the rolling resistance and to improve the treadwear characteristics of tires. On the other hand, rubbers that undergo a large energy loss have generally been utilized in the tread of the tire to increase the wet skid resistance of a tire. To balance these two viscoelastically inconsistent properties, mixtures of various types of synthetic and natural rubber are normally utilized in tire treads. For instance, various mixtures of styrene-butadiene rubber (SBR) and polybutadiene rubber are commonly used as a rubbery material for automobile tire treads.

It has been previously generally understood to be desirable for styrene-butadiene rubber to have a high level of vinyl content (1,2-microstructure) when utilized in tire tread compounds. However, in contrast to providing high vinyl content rubbery polymers, it is believed that rubbery polymers having low, or lower, vinyl microstructure content may provide a more desirable balance of tire tread properties. Such rubbery polymers can be synthesized by solution polymerization in the presence of a catalyst system.

SUMMARY OF THE INVENTION

The present invention is a novel catalyst system for synthesizing rubbery polymers, such as styrene-butadiene rubber or polybutadiene rubber, having low to medium vinyl microstructure content, wherein the rubbery polymers can provide desirable wear properties without substantially sacrificing other performance characteristic(s), e.g., traction properties. The rubbery polymers can be synthesized in the absence of polar modifiers, such as tetrahydrofuran of diamines, e.g., tetra methylethylene diamine (TMEDA).

In accordance with an embodiment of the invention, a catalyst system includes a hydrocarbon soluble complex selected from a potassium alkyl borohydride or potassium alkyl aluminum hydride, i.e., a potassium salt of an alkyl borohydride or a potassium salt of an alkyl aluminum hydride, and an organolithium compound. The hydrocarbon soluble complex is generally defined by the following formula:

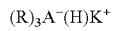

wherein A is boron or aluminum, H is hydrogen, K is potassium, and R, which is the same or different, is either H, a $C_1$-$C_{10}$ alkyl, a $C_3$-$C_{10}$ cycloalkyl, phenyl, or phenyl substituted $C_1$-$C_{10}$ alkyl, or a $C_3$-$C_{10}$ cycloalkyl, with the proviso that at least one R group is a $C_1$-$C_{10}$ alkyl, and further wherein any two R groups may optionally be part of a carbocyclic ring.

The catalyst system catalyzes the polymerization of one or more different types of conjugated diene monomers optionally with vinyl aromatic monomers into rubbery polymers, such as polybutadiene or styrene-butadiene rubber. The resulting rubbery polymers can have low to medium vinyl microstructure content, i.e., from about 10% (low) to about 40% (medium), and are useful in the preparation of tire tread rubber compounds which can exhibit improved wear and tear characteristics.

The formed rubbery polymers provide desirable wear properties without substantially sacrificing other performance characteristic(s), e.g., traction properties.

DETAILED DESCRIPTION

A catalyst system is provided which includes a hydrocarbon soluble complex selected from a potassium alkyl borohydride or potassium alkyl aluminum hydride, i.e., a potassium salt of an alkyl borohydride or a potassium salt of an alkyl aluminum hydride, and an organolithium compound. The catalyst system synthesizes rubbery polymers, such as polybutadiene rubber, styrene-butadiene rubber, alpha-methylstyrene-butadiene rubber, isoprene-butadiene rubber, and styrene-isoprene-butadiene rubber. The rubbery polymers can be synthesized in the absence of polar modifiers, such as tetrahydrofuran or diamines, e.g., tetra methylethylene diamine (TMEDA). The resulting rubbery polymers include a low to medium vinyl microstructure content, i.e., about 10% (low) to about 40% (medium), and can be utilized in tire tread rubbers wherein they provide desirable wear properties without substantially sacrificing other performance characteristic(s). Resulting rubbery copolymers and terpolymers define random polymers, as discussed further below.

The hydrocarbon soluble complex may be represented by the following formula:

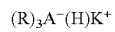

wherein A is boron or aluminum, H is hydrogen, K is potassium, and R, which is the same or different, is either H, a $C_1$-$C_{10}$ alkyl, a $C_3$-$C_{10}$ cycloalkyl, phenyl, or phenyl substituted $C_1$-$C_{10}$ alkyl, or a $C_3$-$C_{10}$ cycloalkyl, with the proviso that at least one R group is a $C_1$-$C_{10}$ alkyl, and further wherein any two R groups may optionally be part of a carbocyclic ring.

The alkyl groups may be straight-chain or branched. In one example, all three of the R groups are $C_1$-$C_{10}$ alkyl. Examples of suitable potassium salts in which the R groups are the same alkyl group include potassium triethylborohydride, potassium triethylaluminum hydride, potassium tri-sec-butylborohydride, potassium tri-sec-butylaluminum hydride, potassium trisiamylborohydride, and potassium trisiamylaluminumhydride. An example of a compound in which two R groups are H and one R group is a $C_1$-$C_{10}$ alkyl is potassium thexylborohydride or potassium thexylaluminumhydride. And, an example of a compound in which two R groups form part of a cyclic ring is potassium 9-borabicyclo[3.3.1]-nonane hydride. In addition, a carbocyclic ring may be bridged by the boron or aluminum atom.

The potassium alkyl borohydrides and potassium alkyl aluminum hydrides generally are commercially available. For example, potassium triethylborohydride and potassium triethylaluminumhydride are available from Callery Chemical of Evans City, Pa. Alternatively, the potassium alkyl borohydrides and potassium alkyl aluminum hydrides may be readily prepared by known methods. The potassium alkyl borohydride and potassium alkyl aluminum hydride may be used in a solvent such as tetrahydrofuran, diglyme, dibutyl ether, toluene or a hydrocarbon solvent, for example, at not more than about 1.5 molar solution. However, it is understood that the person skilled in the art will select a suitable concentration depending upon the solvent used.

The catalyst system also further includes an organolithium compound. The organolithium compounds used in the catalyst system can include the monofunctional and multifunctional initiator types known for polymerizing the conjugated diolefin monomers and vinyl aromatic monomers. The multifunctional organolithium initiators can be either specific organolithium compounds or can be multifunctional types that are not necessarily specific compounds but rather represent reproducible compositions of regulable functionality. The organolithium initiator can also be a functionalized compound.

The choice of initiator can be governed by the degree of branching and the degree of elasticity desired for the polymer, the nature of the feedstock, and the like. With regard to the feedstock employed as the source of conjugated diene, for example, the multifunctional initiator types generally are selected when a low concentration diene stream is at least a portion of the feedstock since some components present in the unpurified low concentration diene stream may tend to react with carbon lithium bonds to deactivate the organolithium compound, thereby necessitating the presence of sufficient lithium functionality so as to override such effects.

The multifunctional organolithium compounds which can be used include those prepared by reacting an organomonolithium compound with a multivinylphosphine or with a multivinylsilane. The reaction typically is conducted in an inert diluent, such as a hydrocarbon or a mixture of a hydrocarbon and a polar organic compound. The reaction between the multivinylsilane or multivinylphosphine and the organomonolithium compound can result in a precipitate which can be solubilized, if desired, by adding a solubilizing monomer such as a conjugated diene or monovinyl aromatic compound after reaction of the primary components. Alternatively, the reaction can be conducted in the presence of a minor amount of the solubilizing monomer. The relative amounts of the organomonolithium compound and the multivinylsilane or the multivinylphosphine can be in the range of about 0.33 to 4 moles of organomonolithium compound per mole of vinyl groups present in the multivinylsilane or multivinylphosphine employed. It is noted that such multifunctional initiators are commonly used as mixtures of compounds rather than as specific individual compounds.

The organomonolithium compounds can include alkyl lithium compounds, such as methyl lithium, ethyl lithium, isopropyl lithium, n-butyllithium, sec-butyllithium, n-heptyllithium, tert-octyl lithium, n-decyl lithium, and n-eicosyl lithium, as well as phenyl lithium, 2-naphthyllithium, 4-butylphenyllithium, 4-tolyllithium, 4-phenylbutyllithium, cyclohexyl lithium, and others known to those having ordinary skill in the art.

The multivinylsilane compounds can include tetravinylsilane, methyltrivinyl silane, diethyldivinylsilane, di-n-dodecyldivinylsilane, cyclohexyltrivinylsilane, phenyltrivinylsilane, benzyltrivinylsilane, (3-ethylcyclohexyl) (3-n-butylphenyl)divinylsilane, and others known to those having ordinary skill in the art.

The multivinylphosphine compounds can include trivinylphosphine, methyldivinylphosphine, dodecyldivinylphosphine, phenyldivinylphosphine, cyclooctyldivinylphosphine, and others known to those having ordinary skill in the art.

Other multifunctional polymerization initiators can be prepared by reacting an organomonolithium compound with a multivinylaromatic compound and either a conjugated diene or monovinylaromatic compound or both. These ingredients are combined with a hydrocarbon or a mixture of a hydrocarbon and a polar organic compound as a diluent. Alternatively, a multifunctional polymerization initiator can be prepared in a two-step process by reacting the organomonolithium compound with a conjugated diene or monovinyl aromatic compound additive, and then adding the multivinyl aromatic compound. Any of the conjugated dienes or monovinyl aromatic compounds described can be employed. The ratio of conjugated diene or monovinyl aromatic compound additive employed, in one example, should be in the range of about 2 to 15 moles of polymerizable compound per mole of organolithium compound. The amount of multivinylaromatic compound employed, in one example, should be in the range of about 0.05 to 2 moles per mole of organomonolithium compound.

The multivinyl aromatic compounds can include 1,2-divinylbenzene, 1,3-divinylbenzene, 1,4-divinylbenzene, 1,2,4-trivinylbenzene, 1,3-divinylnaphthalene, 1,8-divinylnaphthalene, 1,3,5-trivinylnaphthalene, 2,4-divinylbiphenyl, 3,5,4'-trivinylbiphenyl, m-diisopropenyl benzene, p-diisopropenyl benzene, 1,3-divinyl-4,5,8-tributylnaphthalene, and others known to those having ordinary skill in the art. In one example, the multivinyl aromatic compound includes a divinyl aromatic hydrocarbon containing up to 18 carbon atoms per molecule. In another example, the divinyl aromatic hydrocarbon can include divinylbenzene, as either the ortho, meta or para isomer, commercial divinylbenzene, which is a mixture of the three isomers, or other compounds such as the ethyl styrenes.

Other types of multifunctional lithium compounds can be used, such as those prepared by contacting a sec- or tert-organomonolithium compound with 1,3-butadiene, at a ratio of about 2 to 4 moles of the organomonolithium compound per mole of the 1,3-butadiene, in the absence of added polar material, with the contacting, for example, being conducted in an inert hydrocarbon diluent. In another example, the contacting is conducted without the diluent.

Specific organolithium compounds can be used as initiators, if desired, in the preparation of the rubbery polymers. These can be represented by R(Li)x wherein R represents a hydrocarbyl radical containing from 1 to 20 carbon atoms, and wherein x is an integer of 1 to 4. The organolithium compounds can include methyl lithium, isopropyl lithium, n-butyllithium, sec-butyllithium, hexyllithium, tert-octyl lithium, n-decyl lithium, phenyl lithium, 1-naphthyllithium, 4-butylphenyllithium, p-tolyl lithium, 4-phenylbutyllithium, cyclohexyl lithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butane, 1,8-dilithio-3-decene, 1,2-dilithio-1,8-diphenyloctane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, 4,4'-dilithiobiphenyl, and others known to those having ordinary skill in the art.

The organolithium compound can be an alkylsilyloxy protected functional lithium compound as described in U.S. Provisional Application Ser. No. 60/234,686. The teachings of U.S. Provisional Application Ser. No. 60/234,686 are incorporated herein by reference. For instance, the initiator can be an alkylsilyloxy protected functional lithium initiator of the structural formula:

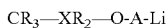

wherein X represents a group IVa element selected from carbon, germanium, or tin; wherein R represents alkyl groups that can be the same or different and that contain from 1 to about 8 carbon atoms; and wherein A represents an alkylene group; or:

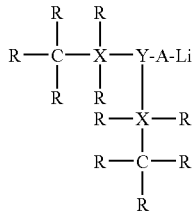

wherein X represents a group IVa element selected from carbon, germanium, or tin; wherein Y represents oxygen, phosphorous, or nitrogen; wherein R represents alkyl groups that can be the same or different and that contain from 1 to about 8 carbon atoms; and wherein A represents an alkylene group; or:

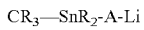

wherein R represents alkyl groups that can be the same or different and that contain from 1 to about 8 carbon atoms, and wherein A represents an alkylene group. The alkylene group can be straight chained or branched. For instance, A can represent a straight chained alkylene group of the structural formula —(CH$_2$)$_n$— or it can represent a branched alkylene group, such as:

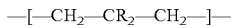

wherein R represents alkyl groups that can be the same or different and that contain from 1 to about 8 carbon atoms. In one example, R represents an alkyl group containing from 1 to about 4 carbon atoms. In another example, R represents methyl groups.

The alkylsilyloxy protected functional lithium initiator will typically be of the structural formula:

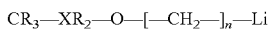

wherein X represents a group IVa element selected from carbon, silicon, germanium, or tin; wherein n represents an integer from 1 to 10; wherein R represents alkyl groups that can be the same or different and that contain from 1 to about 8 carbon atoms; or an alkylsilyloxy protected functional lithium compound of the structural formula:

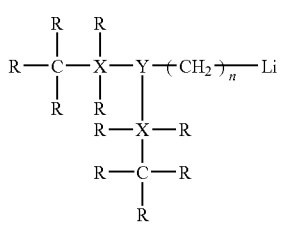

wherein X represents a group IVa element selected from carbon, silicon, germanium, or tin; wherein Y represents oxygen, phosphorous, or nitrogen; wherein n represents an integer from 1 to 10; wherein R represents alkyl groups that can be the same or different and that contain from 1 to about 8 carbon atoms. These rubbery polymers will accordingly normally contain a "living" lithium chain end.

In another example, the alkylsilyloxy protected functional lithium initiator may be of the structural formula:

wherein n represents an integer from 1 to 10, and wherein R represents alkyl groups that can be the same or different and that contain from 1 to about 8 carbon atoms.

Coupling agents also can be used when synthesizing the rubbery polymers to improve the cold flow characteristics of the rubber and rolling resistance of tires made therefrom. It also leads to better processability and other beneficial properties. A wide variety of compounds suitable for such purposes can be employed. Some representative examples of suitable coupling agents include: multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

As discussed above, the catalyst system is used to synthesize rubbery polymers that have a low to medium vinyl microstructure content, i.e., about 10% (low) to about 40% (medium), that can be utilized in tire tread rubbers. In particular, the rubbery polymer includes a low to medium vinyl microstructure content when the vinyl microstructure content (1,2-microstructure) of a polymerized conjugated diene monomer, such as 1,3 butadiene, is from about 10% (low) to about 40% (medium) of its total microstructure content. The rubbery polymers may have a vinyl microstructure content from about 10% to about 35%. In another example, the rubbery polymers may have a vinyl microstructure content from about 15% to about 20%.

The rubber polymers can be synthesized from one or more different types of conjugated diene monomers, such as 1,3-butadiene, isoprene, 2,3-dimethylbutadiene, and optionally vinyl aromatic monomers, such as vinyl, divinyl, or trivinyl benzene monomers, including styrene, α-methyl styrene, p-tertiary-butyl styrene, methyl vinyl toluene, p-vinyl toluene. In one embodiment, the rubbery polymer may be a homopolymer. In another embodiment, the rubbery polymer may be a copolymer or a terpolymer with at least one polymerized monomer selected from a conjugated diene.

In one example, the monomer is 1,3 butadiene or isoprene to provide a polybutadiene rubber or polyisoprene rubber, i.e., a homopolymer. In another example, 1,3 butadiene and styrene or 1,3 butadiene and isoprene to provide, respectively, a styrene-butadiene rubber or isoprene-butadiene rubber, which are copolymers. The monomers may include 1,3 butadiene, isoprene, and styrene to provide a styrene-isoprene-butadiene rubber, i.e., a terpolymer.

The polymerizations are typically carried out in a hydrocarbon solvent, such as one or more aromatic, paraffinic or cycloparaffinic solvents. The solvents generally will contain from 4 to 10 carbon atoms per molecule and will be liquid under the conditions of the polymerization. Some representative examples of suitable organic solvents include pentane, isooctane, cyclohexane, methylcyclohexane, isohexane, n-heptane, n-octane, n-hexane, benzene, toluene, xylene, ethylbenzene, diethylbenzene, isobutylbenzene, petroleum ether, kerosene, petroleum spirits, and petroleum naphtha, alone or in admixture. In the solution polymerizations, there typically will be from about 5 to about 30 weight percent monomers in the polymerization medium. Such polymerization media are comprised of the organic solvent and monomers. In another example, the polymerization medium may contain from about 10 to about 25 weight percent monomers. In yet another example, the polymerization medium can contain about 15 to about 20 weight percent monomers.

The potassium alkyl borohydride and potassium alkyl aluminum hydride will normally be present in the polymerization medium in an amount that is within the range of about 0.05 to about 2.00 phm (parts by 100 parts by weight of total monomer). In one example, from about 0.05 phm to about 1.00 phm of the hydrocarbon soluble complex can be utilized. The organolithium compound will normally be present in the polymerization medium in an amount that is within the range of about 0.30 to about 1.00 phm (parts by 100 parts by weight of total monomer).

The copolymer rubbers derived from a conjugated diene monomer and a vinyl aromatic monomer will typically contain from about 2 weight percent to about 50 weight percent vinyl aromatic monomer, such as styrene, and from about 50 weight percent to about 98 weight percent conjugated diene monomer, such as 1,3-butadiene. However, in some cases, the amount of vinyl aromatic monomer will be as low as about 1 weight percent. In another example, the copolymer rubbers will contain from about 3 weight percent to about 30 weight percent vinyl aromatic monomer and from about 70 weight percent to about 97 weight percent 1,3-conjugated diene monomer.

The copolymer rubbers derived from two different conjugated diene monomers, with one monomer being butadiene, will typically contain from about 50 weight percent to about 98 weight percent 1,3-butadiene and from about 2 weight percent to about 50 weight percent other conjugated diene monomer, such as isoprene. However, in some cases, the amount of other conjugated diene monomer included will be as low as about 1 weight percent.

The terpolymer rubbers derived from at least two different conjugated diene monomers, with one monomer being butadiene, and a vinyl aromatic monomer will typically contain from about 50 weight percent to about 98 weight percent 1,3-butadiene and from about 2 weight percent to about 50 weight percent vinyl aromatic monomer plus other conjugated diene monomer, such as isoprene.

The distribution of repeat units in the copolymer and terpolymer rubbers is essentially random. The term "random" as used herein means that less than 10 percent of the total quantity of repeat units of a monomer are in blocks containing more than five repeat units. In other words, more than 90 percent of the repeat units are in blocks containing five or fewer repeat units. The copolymers and terpolymers also tend to have a consistent composition throughout their polymer chains. In other words, the content of a specific monomer of the polymer will be about the same from the beginning to the end of the polymer chain. For example, no segments of at least 100 repeat units within the polymer will have a styrene content which differs from the total styrene content of the polymer by more than about 10 percent.

The polymerizations of this invention are initiated by adding the catalyst system, which includes the hydrocarbon soluble complex, i.e., the potassium alkyl borohydride or potassium alkyl aluminum hydride as defined above, and the organolithium compound, to a polymerization medium, or premix, containing the monomers to be polymerized. The catalyst system may be added to the premix in any desired amount. In one example, the catalyst system is provided in an amount of about 0.100 mmole to about 0.900 mmol/per 100 parts by weight of total monomer. In another example, the catalyst system is provided in an amount of about 0.200 mmole to about 0.700 mmol/per 100 parts by weight of total monomer. The molar ratio of the hydrocarbon soluble complex to organolithium compound will typically be within the range of about 1:0.2 to about 1:4. In one example, the molar ratio is about 1:0.25 to about 1:3. In another example, the molar ratio is about 1:0.5 to about 1:2. In yet another example, the molar ratio is about 1:1. The polymerizations can be carried out utilizing batch, semi-continuous or continuous techniques, as known to those having ordinary skill in the art.

The polymerization is conducted for a length of time sufficient to permit substantially complete polymerization of monomers. In other words, the polymerization is normally carried out until high conversions are attained. The polymerization temperature utilized can vary over a broad temperature range of from about 20° C. to about 180° C. In another example, a temperature within the range of about 40° C. to about 120° C. can be utilized. In yet another example, the polymerization temperature can be within the range of about 70° C. to about 100° C. The pressure used will normally be sufficient to maintain a substantially liquid phase under the conditions of the polymerization reaction.

After the polymerization has been completed, the rubbery polymer can be recovered from the organic solvent and residue by means such as decantation, filtration, centrification, and others known to those having ordinary skill in the art. It may be desirable to precipitate the polymer from the organic solvent by the addition of lower alcohols containing from about 1 to about 4 carbon atoms to the polymer solution. Suitable lower alcohols for precipitation of the segmented polymer from the polymer cement include methanol, ethanol, isopropyl alcohol, normal-propyl alcohol and t-butyl alcohol. The utilization of lower alcohols to precipitate the rubber from the polymer cement also "kills" or terminates the living polymer by inactivating lithium end groups of the organolithium initiator compound. The polymerization can also be terminated with other conventional noncoupling types of terminators, such as water, an acid, or with a coupling agent, for example. After the polymer is recovered from the solution, steam-stripping can be employed to reduce the level of volatile organic compounds in the rubber.

There are certain benefits in tire tread compounds derived from the rubbery polymers made with the catalyst systems. For example, polybutadiene rubber, polyisoprene rubber, styrene-butadiene rubber, alpha-methyl styrene butadiene, isoprene-butadiene rubber, and styrene-isoprene-butadiene rubber made with the catalyst system can be blended, for example, with natural rubber to make rubber components, such as tread compounds, for passenger tires that can exhibit desirable rolling resistance, traction, tear, and/or tread wear characteristics.

Non-limiting examples of the catalyst system, and use thereof, in accordance with the description are now disclosed below. These examples are merely for the purpose of illustration and are not to be regarded as limiting the scope of the invention or the manner in which it can be practiced. Other examples will be appreciated by a person having ordinary skill in the art.

Example 1

In this experiment, 2000 g of a hexane premix containing about 20% monomer(s) consisting of 10% styrene and 90% butadiene was charged to a one gallon stainless steel reactor with an air-driven motor, a nitrogen inlet for providing an inert nitrogen atmosphere, and internal heating/cooling coils for temperature regulation. The catalyst system, which included potassium triethylborohydride and n-butyl lithium, was added to the premix in a ratio of 0.25 mmol of catalyst per 100 g of the monomer mixture. The molar ratio of potassium triethylborohydride to n-butyl lithium was 1:1.

The polymerization was carried out at 90° C. and the reaction monitored using gas chromatography ("GC") to detect for the presence of unreacted monomers. After 25 minutes, 98% conversion of the monomers was realized. After polymerization was completed, ethanol was added to shortstop the polymerization. The polymer cement was then removed from the reactor and stabilized with antioxidant. After evaporating hexanes, the resulting polymer was dried in a vacuum oven. The rubbery polymer was characterized using, for example, differential scanning calorimetry (DSC) and nuclear magnetic resonance (NMR). The results are set out in Table 1 below.

Examples 2-5

For Examples 2-5, the same procedure and catalyst materials were utilized as in Example 1, except the catalyst concentration and ratios were varied to determine the effect on molecular weight. The ratio of styrene to butadiene was varied as well. The rubbery polymers similarly were characterized using, for example, differential scanning calorimetry (DSC) and nuclear magnetic resonance (NMR). Examples 2-5, along with their results, are also set out in Table 1.

Example 6

In this experiment, 2000 g of a hexane premix containing about 20% monomer(s) consisting of 10% styrene and 90% butadiene was charged to a one gallon stainless steel reactor with an air-driven motor, a nitrogen inlet for providing an inert nitrogen atmosphere, and internal heating/cooling coils for temperature regulation. The catalyst system, which included potassium triethylaluminumhydride and n-butyl lithium, was added to the premix in a ratio of 0.25 mmol of catalyst per 100 g of the monomer mixture. The molar ratio of potassium triethylaluminumhydride to n-butyl lithium was 1:1.

The polymerization was carried out at 90° C. and the reaction monitored using gas chromatography ("GC") to detect for the presence of unreacted monomers. After 25 minutes, 98% conversion of the monomers was realized. After polymerization was completed, ethanol was added to shortstop the polymerization. The polymer cement was then removed from the reactor and stabilized with antioxidant. After evaporating hexanes, the resulting polymer was dried in a vacuum oven. The rubbery polymer was characterized using, for example, differential scanning calorimetry (DSC) and nuclear magnetic resonance (NMR). The results are set out in Table 2 below.

Examples 7-10

For Examples 7-10, the same procedure and catalyst materials were utilized as in Example 6, except the catalyst concentration and ratios were varied to determine the effect on

TABLE 1

| | Example | | | | |
|---|---|---|---|---|---|
| | 1 | 2 | 3 | 4 | 5 |
| Styrene/butadiene ratio | 10/90 | 15/75 | 20/80 | 25/75 | 30/70 |
| Glass transition temperature (Tg ° C.) | −85° C. | −82° C. | −77° C. | −75° C. | −71° C. |
| Catalyst Concentration (per 100 g monomer mixture) | 0.25 mmole | 0.33 mmole | 0.15 mmole | 0.25 mmole | 0.40 mmole |
| Number avg. molecular weight (Mn) | 250,000 | 225,000 | 300,000 | 250,000 | 200,000 |
| Weight avg. molecular weight (Mw) | 300,000 | 325,000 | 400,000 | 525,000 | 230,000 |
| Vinyl 1,2 content (%) | 14 | 14 | 18 | 17 | 20 |
| 1,4-trans content (%) | 56 | 51 | 49 | 49 | 52 |
| 1,4-Cis content (%) | 30 | 35 | 33 | 34 | 28 |
| ML4 @ 100° C. | 66 | 77 | 87 | 88 | 75 |
| Short Stop | Isopropanol | Isopropanol | Isopropanol | Isopropanol | Isopropanol |
| Triethyl borohydride/n-butyl lithium ratio | 1/1 | 1/0.5 | 1/0.25 | 2/4 | 2/6 | molecular weight. The ratio of styrene to butadiene was varied as well. The rubbery polymers similarly were characterized using, for example, differential scanning calorimetry (DSC) and nuclear magnetic resonance (NMR). Examples 7-10, along with their results, are also set out in Table 2.

TABLE 2

| | Example | | | | |
|---|---|---|---|---|---|
| | 6 | 7 | 8 | 9 | 10 |
| Styrene/butadiene ratio | 10/90 | 15/75 | 20/80 | 25/75 | 30/70 |
| Glass transition temperature (Tg °C.) | −72° C. | −67° C. | −55° C. | −40° C. | −25° C. |
| Catalyst Concentration (per 100 g monomer mixture) | 0.25 mmole | 0.33 mmole | 0.15 mmole | 0.25 mmole | 0.40 mmole |
| Number avg. molecular weight (Mn) | 500,000 | 300,000 | 100,000 | 50,000 | 30,000 |
| Weight avg. molecular weight (Mw) | 300,000 | 325,000 | 400,000 | 525,000 | 230,000 |
| Vinyl 1,2 content (%) | 20 | 15 | 30 | 20 | 35 |
| 1,4-Cis and trans content (%) | 80 | 75 | 70 | 80 | 65 |
| ML4 @ 100° C. | 120 | 88 | 40 | 10 | 5 |
| Short Stop | Isopropanol | Isopropanol | Isopropanol | Isopropanol | Isopropanol |
| Triethyl aluminumhdride/ n-butyl lithium ratio | 1/1 | 2/0.5 | 3/0.70 | 2/4 | 2/6 |

The solution polymerizations using the above catalyst systems produced styrene-butadiene rubber having desirable vinyl microstructure content, as well as desirable glass transition temperatures. Such glass transition temperatures from the above examples indicate more desirable low temperature properties. These low temperature properties can translate into rubber compounds with good wearing properties and desirable traction properties suitable for use in tires. The presence of the lower vinyl microstructure content, i.e., from 14% to 35% of total vinyl 1,2 microstructure of polybutadiene in the above examples, is generally beneficial for providing desirable tearing properties which can give desirable endurance to truck tires, for example. Moreover, such polymers can be useful in building tread rubbers in tire making equipment as a result of lower shrinkage and distortion of the tread compound on extrusion.

As indicated above, the resulting rubbery polymer may be further compounded with additional ingredients to provide a rubber compound, such as for use in a tire tread for a tire, which may have the above desirable characteristics. Specifically selected additives may be provided in the rubber compound, such as, for example, fillers including 100% silica, 100% carbon black, and mixtures thereof and curing agents. Other additives may be added as desired including curing aids such as activators, retarders and accelerators, rubber processing oils, resins including tackifying resins, plasticizers, fatty acid, zinc oxide, waxes, antidegradant, antiozonants, and peptizing agents. These other additives, depending on the intended use of the rubber compound, are selected and used in conventional amounts.

The rubber compound, which includes, for example, the rubbery polymer having low to medium vinyl microstructure, silica and/or carbon black, and curing agent, may be compounded by methods generally known in the rubber compounding art, such as by mixing the various constituent materials in the amounts listed above at a temperature in a range of from about 135° C. to about 180° C. to form a green rubber. The green rubber may be further formed into a tire tread, or other rubber component, and cured on a tire (not shown) by means well known in the art. Such rubber compound provides desirable wear properties without substantially sacrificing other performance characteristic(s), e.g., traction properties.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative product and method and illustrative examples shown and described. Accordingly, departures may be made from such details without departing from the scope of the general inventive concept.

What is claimed is:

1. A method comprising:
polymerizing one or more different types of conjugated diene monomers and optionally vinyl aromatic monomers in the presence of a catalyst system for synthesizing rubbery polymers, the catalyst system comprising:
a complex defined by the following formula:

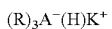

wherein A is boron or aluminum, and R, which is the same or different, is either H, a $C_1$-$C_{10}$ alkyl, a $C_3$-$C_{10}$ cycloalkyl, phenyl, or phenyl substituted $C_1$-$C_{10}$ alkyl, or a $C_3$-$C_{10}$ cycloalkyl, with the proviso that at least one R group is a $C_1$-$C_{10}$ alkyl, and further wherein any two R groups may optionally be part of a carbocyclic ring; and
an organolithium compound.

2. The method of claim 1 wherein A is boron.

3. The method of claim 1 wherein A is aluminum.

4. The method of claim 1 wherein each R group is a $C_1$-$C_{10}$ alkyl to define a potassium trialkyl borohydride or potassium trialkyl aluminum hydride.

5. The method of claim 1 wherein polymerizing the conjugated diolefin monomer in the presence of the catalyst system includes polymerizing the vinyl aromatic monomer with the one or more different types of conjugated diolefin monomers.

6. The method of claim 1 wherein polymerizing the conjugated diolefin monomer in the presence of the catalyst system includes polymerizing the one or more different types of conjugated diolefin monomers.

7. The method of claim 1, wherein the catalyst system is present in an amount of about 0.1 mmol to about 0.9 mmol per 100 parts by weight of total monomer.

8. The method of claim 1, wherein the catalyst system is present in an amount of about 0.2 mmol to about 0.7 mmol per 100 parts by weight of total monomer.

9. The method of claim 1, wherein the molar ratio of the complex to the organolithium compound is from about 1:0.2 to about 1:4.

10. The method of claim 1, wherein the molar ratio of the complex to the organolithium compound is from about 1:0.25 to about 1:3.

11. The method of claim 1, wherein the molar ratio of the complex to the organolithium compound is from about 1:0.5 to about 1:2.

12. The method of claim 1, wherein the molar ratio of the complex to the organolithium compound is about 1:1.

13. The method of claim 9 further comprising:
    isolating the synthesized rubbery polymer, wherein the rubbery polymer has a vinyl microstructure from about 10% to about 40%.

14. The method of claim 13, wherein the vinyl microstructure is from about 10% to about 35%.

15. The method of claim 13, wherein the vinyl microstructure is from about 15% to about 20%.

* * * * *

UNITED STATES PATENT AND TRADEMARK OFFICE
CERTIFICATE OF CORRECTION

PATENT NO. : 7,825,202 B2  
APPLICATION NO. : 12/248601  
DATED : November 2, 2010  
INVENTOR(S) : John Robert Zuppo, III It is certified that error appears in the above-identified patent and that said Letters Patent is hereby corrected as shown below:

Column 1, cover page cite, change "...6,716,925...Jacoby et al." to
-- 6,716,925...Thielen et al. --

Column 14, line 12, change "The method of claim 9 further comprising:" to
-- The method of claim 1 further comprising: --

Signed and Sealed this
Nineteenth Day of July, 2011

David J. Kappos
*Director of the United States Patent and Trademark Office*